US012660911B2

(12) United States Patent
Beck et al.

(10) Patent No.: US 12,660,911 B2
(45) Date of Patent: Jun. 23, 2026

(54) UNIT DOSE ORAL CLEANING DEVICE AND PRODUCT DISPENSING SYSTEM

(71) Applicant: Sage Products, LLC, Cary, IL (US)

(72) Inventors: David P. Beck, Cary, IL (US); Jason M. Bobay, Cary, IL (US); Ronald C. Cagle, Cary, IL (US); Kristin Marie Sexton, Cary, IL (US)

(73) Assignee: Sage Products, LLC, Cary, IL (US)

( * ) Notice: Subject to any disclaimer, the term of this patent is extended or adjusted under 35 U.S.C. 154(b) by 0 days.

(21) Appl. No.: 18/948,796

(22) Filed: Nov. 15, 2024

(65) Prior Publication Data

US 2025/0072593 A1 Mar. 6, 2025

Related U.S. Application Data

(60) Continuation of application No. 18/132,059, filed on Apr. 7, 2023, now Pat. No. 12,171,325, which is a (Continued)

(51) Int. Cl.
*A46B 11/00* (2006.01)
*A46B 9/04* (2006.01)
(Continued)

(52) U.S. Cl.
CPC ............ *A46B 11/0003* (2013.01); *A46B 9/04* (2013.01); *A46B 11/002* (2013.01); (Continued)

(58) Field of Classification Search
CPC ............ A46B 11/0003; A46B 15/0093; A46B 11/0058; A46B 9/04; A46B 15/0091; A46B 2200/01; A46B 2200/10
(Continued)

(56) References Cited

U.S. PATENT DOCUMENTS 4,277,194 A 7/1981 Smith
4,457,641 A 7/1984 Smith
(Continued)

FOREIGN PATENT DOCUMENTS

CN 2329229 Y 7/1999

OTHER PUBLICATIONS

Cantrell, Susan., Inside the Current Issue, "Medical devices a HAI-maintenance issue" (Jan. 2014) https://cdn.hpnonline.com/inside/2014-01/1401-IP-DeviceAcquiredInfection.html.
(Continued)

*Primary Examiner* — Ernesto A Grano
(74) *Attorney, Agent, or Firm* — Foley & Lardner LLP

(57) ABSTRACT

An oral care system includes a first package, a second package, and a container. The first package has a first identifier associated with a first time of day. The first package contains a first unit dose suction brush. The first unit dose suction brush includes a first handle, a first cleaning head, and a first vacuum port. The first handle has a first brush first end and a first brush second end opposite the first brush first end, the first handle having a first suction channel extending from the first brush first end to the first brush second end. The first cleaning head is connected to the first brush first end. The first cleaning head includes a first suction port and a plurality of first bristles arranged in a first pattern surrounding the first suction port. The first vacuum port is located at the first brush second end.

15 Claims, 7 Drawing Sheets

Related U.S. Application Data continuation of application No. 16/901,613, filed on Jun. 15, 2020, now abandoned, which is a continuation of application No. 16/448,712, filed on Jun. 21, 2019, now Pat. No. 10,687,612, which is a division of application No. 15/582,477, filed on Apr. 28, 2017, now Pat. No. 10,327,539.

(60) Provisional application No. 62/329,674, filed on Apr. 29, 2016.

(51) Int. Cl.
*A46B 15/00* (2006.01)
*B08B 1/12* (2024.01)

(52) U.S. Cl.
CPC ...... *A46B 11/0058* (2013.01); *A46B 11/0079* (2013.01); *A46B 15/004* (2013.01); *A46B 15/0053* (2013.01); *A46B 15/0085* (2013.01); *A46B 15/0093* (2013.01); *B08B 1/12* (2024.01); *A46B 2200/01* (2013.01); *A46B 2200/1066* (2013.01)

(58) Field of Classification Search
USPC ........................................................ 206/362.1
See application file for complete search history.

(56) References Cited

U.S. PATENT DOCUMENTS

| | | | |
|---|---|---|---|
| 4,530,129 A | 7/1985 | Labick et al. | |
| 4,880,111 A | 11/1989 | Bagwell et al. | |
| 5,911,319 A | 6/1999 | Porcelli et al. | |
| 6,067,684 A | 5/2000 | Kweon | |
| 6,095,710 A | 8/2000 | Ayeni | |
| 6,238,213 B1 | 5/2001 | Young et al. | |
| 6,397,860 B1 | 6/2002 | Hill, II | |
| 7,241,066 B1 | 7/2007 | Rosen et al. | |
| 7,270,239 B1 | 9/2007 | Ross | |
| D580,749 S | 11/2008 | Miller | |
| 8,997,761 B1 | 4/2015 | Mitchell | |
| 9,022,680 B1 | 5/2015 | Lubyanitskiy et al. | |
| 9,332,827 B2 * | 5/2016 | Lee | A46B 15/0091 |
| 9,975,679 B2 | 5/2018 | Hulliger | |
| D847,625 S | 5/2019 | Bryzek et al. | |
| 2002/0017310 A1 | 2/2002 | Gruenbacher et al. | |
| 2002/0175101 A1 | 11/2002 | Albert | |
| 2003/0012594 A1 | 1/2003 | Andersen | |
| 2004/0148054 A1 | 7/2004 | Schwartz | |
| 2004/0237226 A1 * | 12/2004 | Hohlbein | A46B 11/0003 15/22.1 |
| 2005/0069373 A1 | 3/2005 | Parikh et al. | |
| 2005/0233279 A1 | 10/2005 | Zeh et al. | |
| 2005/0269219 A1 | 12/2005 | Discko | |
| 2005/0284499 A1 | 12/2005 | Fleming | |
| 2007/0045135 A1 | 3/2007 | Berger Sharp et al. | |
| 2007/0209676 A1 | 9/2007 | Mccabe et al. | |
| 2008/0120798 A1 * | 5/2008 | Sorrentino | A46B 15/0055 15/167.1 |
| 2010/0200435 A1 | 8/2010 | Baus | |
| 2013/0058699 A1 | 3/2013 | Bollinger | |
| 2013/0252206 A1 | 9/2013 | Lee | |
| 2013/0276815 A1 | 10/2013 | Hohlbein et al. | |
| 2014/0014543 A1 | 1/2014 | Hohlbein | |
| 2015/0047134 A1 * | 2/2015 | Prendergast | A61C 17/20 15/4 |
| 2018/0256430 A1 * | 9/2018 | Zachar | A46B 15/0053 |
| 2018/0352948 A1 | 12/2018 | Bryzek et al. | |

OTHER PUBLICATIONS

International Search Report and Written Opinion for International Application No. PCT/US2017/030277, mailed Jul. 17, 2017, 15 pages.

* cited by examiner

UNIT DOSE ORAL CLEANING DEVICE AND PRODUCT DISPENSING SYSTEM

CROSS-REFERENCE TO RELATED PATENT APPLICATIONS

This application is a continuation of U.S. patent application Ser. No. 18/132,059, filed Apr. 7, 2023, which is a continuation of U.S. patent application Ser. No. 16/901,613, filed Jun. 15, 2020, which is a continuation of U.S. patent application Ser. No. 16/448,712, filed Jun. 21, 2019, which is a divisional of U.S. patent application Ser. No. 15/582,477, filed Apr. 28, 2017, which claims the benefit of and priority to U.S. Provisional Patent Application No. 62/329,674, filed Apr. 29, 2016. Each of the above-mentioned applications is hereby incorporated herein by reference in its entirety.

BACKGROUND

The present disclosure generally relates to oral care devices and a product dispensing system, and, more particularly, to a unit-dose toothbrush which may be configured for suction and non-suction operation. The toothbrush may be individually packaged and may be part of a product dispensing system having a plurality of separately packaged products arranged in an organized, sequential fashion for individual dispensation and use.

Standard toothbrushes are commonly used and are well known. More recently, toothbrush designs have been developed that enable a toothbrush to dispense toothpaste. However, the prior art designs are not suitable for use in hospitals or other medical treatment facilities, where patients may have compromised immune systems or be on ventilators. For example, reuse of such a toothbrush creates a risk of bacterial infection. Further, patients on ventilators, as well as some non-ventilated patients, are unable to spit, expectorate, or otherwise voluntarily remove liquids from their mouths, necessitating the use of suction. The need to use a suction device alongside a toothbrush or other cleaning device complicates oral cleanings and creates a risk of patient injury or infection. Standard toothpaste may also be unsuitable for use by such patients. Accordingly, an improved design of toothbrush is required.

Other recent designs include toothbrushes connected to a vacuum source. However, these prior art designs require individuals using the toothbrush to apply the appropriate amount of cleaning solution. Furthermore, such devices require the individual to hook up or separately activate the vacuum source at the appropriate time. Both of these steps may be too complicated for a patient in a medical facility to perform correctly on their own, risking that the patient will apply an incorrect dosage of cleaning solution, will prematurely activate the vacuum source, or will inadvertently swallow cleaning solution from failing to activate the vacuum source in a timely manner.

Additionally, in many circumstances, medical products such as toothbrushes or other medical devices must be used multiple times. For example, in medical care and with particular reference to oral care, a series of mouth care products must be used in a repetitious fashion, such as for periodic cleaning sessions, where there can be evacuation, brushing of the teeth, and swabbing of the mouth and gums. Fresh tools may be used for each procedure, and with the repetition of each procedure occurring after a predetermined interval, such as every few hours, it is advantageous to have all of the necessary implements available to the mouth care professional in an organized, sequential and logical manner. This not only facilitates proper care, but also helps avoid missing any critical care steps each time mouth care is undertaken.

Further, there is a need to ensure that periodic procedures have been performed and that a predetermined treatment plan has been followed. In particular, when procedures must be administered frequently or numerous individuals are responsible for providing care or ensuring compliance with a treatment plan, there is a need for a reliable, readily perceivable indicator as to whether the treatment plan has been followed. For example, a health care provider may need to rapidly confirm whether a patient has performed a prescribed series of treatments during a day, or whether another provider has rendered the prescribed treatments already during a particular day.

Accordingly, there is a need for an improved product dispensing system which ensures compliance with a treatment plan in general, and more particularly for a system for dispensing products and ensuring compliance with an oral care routine without requiring significant training or additional effort for a patient or health care provider.

SUMMARY

An embodiment of the present disclosure provides an oral cleaning device, such as a toothbrush, in a kit that increases brushing compliance in the hospital. In an embodiment, a toothbrush is provided in a kit of four brushes, as research demonstrates that brushing four times daily reduces the risk of pneumonia in the non-ventilated patient. The brushes are visible so it is easy for the clinician to check on daily compliance.

An embodiment of the present disclosure provides an oral cleaning device, such as a toothbrush, that helps reduce the risk of pneumonia. A unit dose of disinfectant mouth gel or other oral cleaning solution is applied in a dentifrice syringe type mechanism. The plunger end pushes the gel through a hollow cavity and exits onto the brush bristles. The plunger end is sealed with a foil/plastic laminate. At a certain point after the majority of gel has been dispensed, the foil is pierced by an internal feature in the brush head. This now opens the end of the plunger attached to suction to the three suction ports in the brush head. These suction ports allow a clinician to remove any excess fluids in a patient's mouth. The O-ring on the plunger ensures a seal so the gel does not leak prior to application and creates an airtight seal for the suction. The plunger when fully extended locks into position, which cannot be reversed, thereby making the brush single use.

An embodiment of the present disclosure provides a product dispensing system comprising a plurality of individually packaged items arranged in an organized fashion. A carrier is provided to arrange the packaged items sequentially, the separate packages being secured to and extending from the carrier. The carrier includes visual indicia capable of identifying each item and providing instructions regarding the manner and time in which each item should be used.

In accordance with an embodiment of the disclosure, the carrier is configured to hold a sequential arrangement of single-use items to be used at predetermined times in a manner which allows for quick visual inspection to determine compliance with a treatment plan.

In another embodiment, the present disclosure provides an oral cleaning device that includes an elongated, hollow body having a bottom end and a cleaning end, a cleaning head, and a neck portion extending between the cleaning end of the hollow body and the cleaning head. The neck portion forms a fluid channel between the hollow body and the cleaning head and wherein the cleaning head includes at least one opening in fluid communication with the fluid channel. The device further includes a plunger located within the hollow body, and movable between a first position proximate the bottom end and a second position proximate the cleaning end, and a solution chamber formed within the hollow body at the cleaning end. The solution chamber contains a cleaning solution and is in fluid communication with the fluid channel in the neck portion. A cleaning end of the plunger is configured to move the cleaning solution in the solution chamber through the fluid channel in the neck portion and through the at least one opening in the cleaning head when the plunger is moved from the first position toward the second position.

In some embodiments, the plunger is hollow and comprises a seal at the cleaning end of the plunger so as to form an airtight closure across the cleaning end of the plunger. In some embodiments, the device further includes a vacuum port located at a bottom end of the plunger, a suction channel formed in the hollow plunger, and a piercing element configured to penetrate the seal when the plunger is moved into the second position, thereby providing fluid communication between the suction channel and the fluid channel. In some embodiments, an airtight seal is formed between an exterior surface of the plunger and an interior surface of the hollow body.

In some embodiments, the device further includes an opening in the hollow body, and a suction activation opening, wherein the suction activation opening extends between the suction channel and an exterior of the hollow body through the opening in the hollow body. In some embodiments, the suction activation opening is configured such that when the plunger is in the second position and the suction adjustment opening is covered, the vacuum port and the at least one opening in the cleaning head are communicatively coupled so as to provide suction to the cleaning head.

In some embodiments, the device further includes a locking mechanism configured to prevent the plunger from returning to the first position from the second position.

In some embodiments, the device further includes a capsule contained in the solution chamber, wherein the capsule holds the cleaning solution, and a piercing element configured to puncture the capsule when the capsule is forced towards the cleaning end by the plunger, thereby releasing the cleaning solution and allowing the cleaning solution to move through the fluid channel. In some embodiments, the device further includes a vacuum port located at a bottom end of the plunger, and a suction channel formed in the hollow plunger, wherein the piercing element is further configured to puncture a second portion of the capsule, thereby providing fluid communication between the suction channel and the fluid channel.

In some embodiments, the device further includes a fluid channel seal forming a closure between the fluid channel and the solution chamber, and a piercing element configured to pierce the fluid channel seal as the plunger moves from the first position to the second position to allow the cleaning solution to move into the fluid channel. In some embodiments, the plunger is hollow and comprises a seal at the cleaning end of the plunger so as to form an airtight closure across the cleaning end of the plunger. In some embodiments, the device further includes a vacuum port located at a bottom end of the plunger, a suction channel formed in the hollow plunger, and a second piercing element configured to penetrate the plunger seal when the plunger is moved into the second position, thereby providing fluid communication between the suction channel and the fluid channel.

In some embodiments, the cleaning head portion comprises at least one cleaning element. In some embodiments, the oral cleaning device is a toothbrush and wherein the at least one cleaning element is a bristle.

In another aspect, the present disclosure provides a method of using an oral cleaning device for oral care. The method includes providing an oral cleaning device according to any of the embodiments described above, and moving the plunger from the first position toward the second position, thereby forcing the cleaning solution in the solution chamber through the fluid channel in the neck portion and through the at least one opening in the cleaning head.

In some embodiments, the plunger is hollow and comprises a seal at the cleaning end of the plunger so as to form an airtight closure across the cleaning end of the plunger.

In some embodiments, the method further includes providing suction in the hollow plunger and wherein moving the plunger to the second position causes a break in the seal such that suction is further provided through the fluid channel and through the at least one opening in the cleaning head. In some embodiments, providing suction in the hollow plunger includes providing the oral cleaning device with a vacuum port located at a bottom end of the plunger and a suction channel formed in the hollow plunger.

In some embodiments, the oral cleaning device includes an opening in the hollow body and a suction activation opening extending between the suction channel and an exterior of the hollow body through the opening in the hollow body, and the method includes covering the suction activation opening so as to provide suction from the vacuum port to the cleaning head.

In some embodiments, the oral cleaning device further includes a piercing element which pierces the seal when the plunger is moved to the second position.

BRIEF DESCRIPTION OF THE FIGURES

The following disclosure as a whole may be best understood by reference to the provided detailed description when read in conjunction with the accompanying drawings, drawing descriptions, abstract, background, field of the disclosure, and associated headings. Identical reference numerals, when found on different figures, identify the same elements or functionally equivalent elements. The elements listed in the abstract are not referenced but nevertheless refer by association to the elements of the detailed description and associated disclosure.

DETAILED DESCRIPTION

Figure 1:
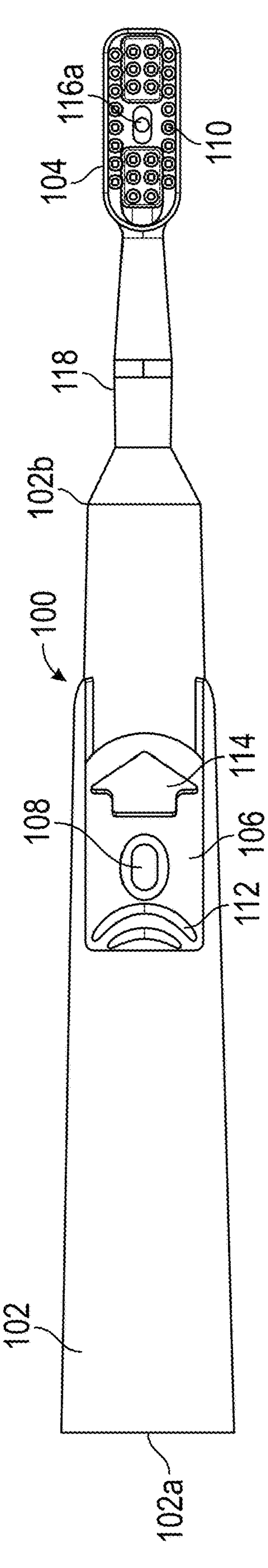
FIG. 1 is front elevation view of an oral cleaning device in accordance with an embodiment of the present disclosure.
Figure 2:
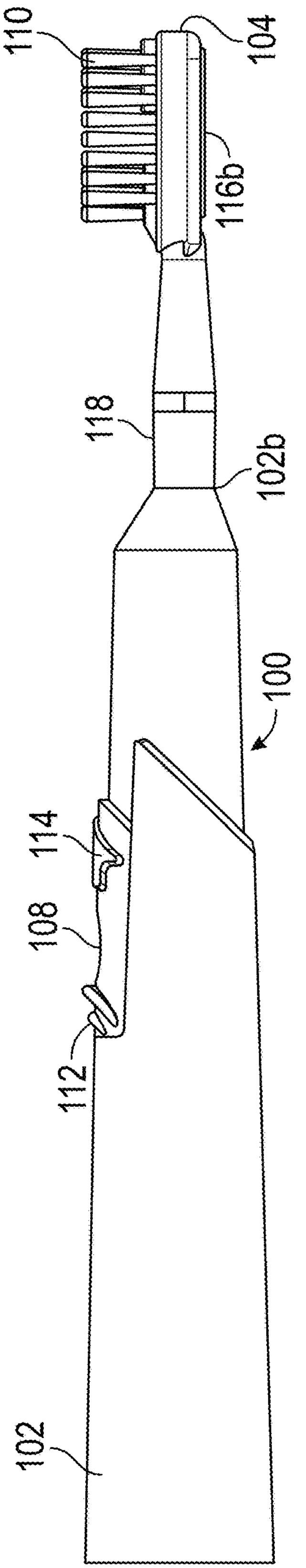
FIG. 2 is a side elevation view of the oral cleaning device of FIG. 1.
Figure 3:
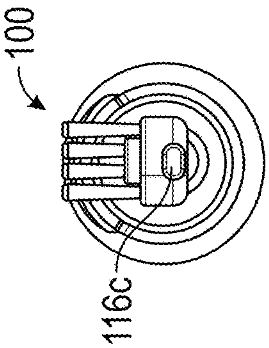
FIG. 3 is a top elevation view of the oral cleaning device of FIG. 1.
Figure 4:
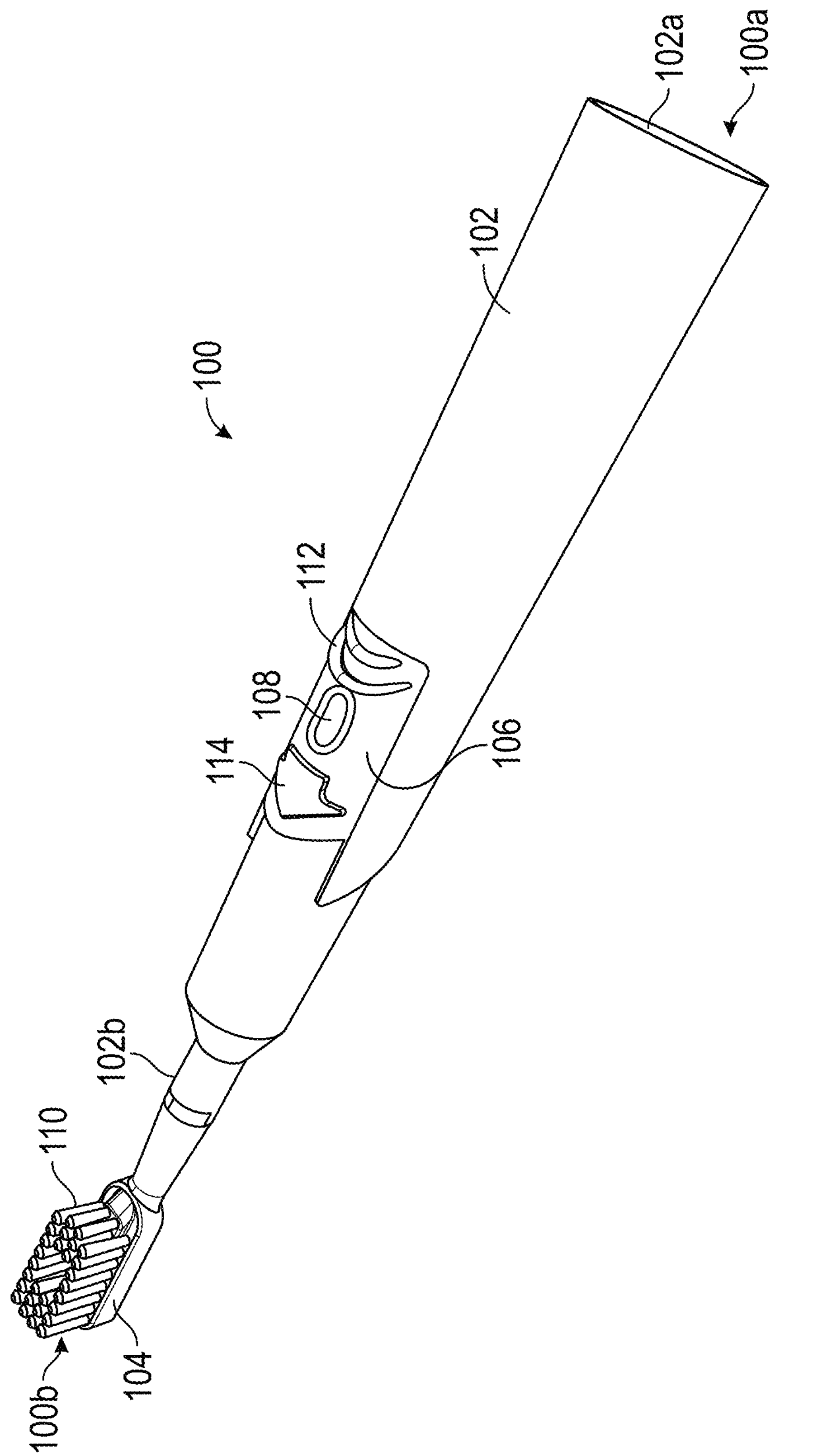
FIG. 4 is a perspective view of the oral cleaning device of FIG. 1.

The present disclosure is not limited to the particular details of the apparatus depicted, and other modifications and applications may be contemplated. Further changes may be made in the apparatus, device, or methods without departing from the true spirit and scope of the disclosure herein involved. It is intended, therefore, that the subject matter in this disclosure should be interpreted as illustrative, not in a limiting sense.

As shown in FIGS. 1-4, in an exemplary embodiment of the present disclosure, an oral cleaning device is shown. In the figures, the oral cleaning device is a unit dose suction brush 100, which is elongated and hollow, having a bottom end 100*a* (also referred to herein as the suction end) and a top end 100*b* (also referred to herein as the cleaning end) located at opposite axial ends of the unit dose suction brush 100.

The unit dose suction brush includes a substantially hollow handle 102 with a bottom end 102*a* and a top end 102*b*. The handle 102, located towards the suction end 100*a*, is connected to a cleaning head 104 which is located at the cleaning end 100*b*. In an embodiment, the top end 102*b* of the handle 102 tapers to a neck 118, such that the neck 118 is substantially narrower than the bottom end 102*a* of the handle 102. The exterior of the bottom end of the cleaning head 104 is substantially the same size as the exterior of the top end 102*b* of the handle. The neck 118 (which includes the bottom portion of the cleaning head 104 and the top portion of the handle 102) may be substantially straight (as illustrated) or may be bent at an angle or curved to allow for easier use.

A plunger slide 106 is slidably mounted to the handle 102. The plunger slide is configured to move along the handle 102 toward the top end 102*b* of the handle 102. In some embodiments, the plunger slide 106 moves around the circumference of the handle 102. The plunger slide 106 comprises a suction regulator, such as suction regulator aperture 108 which is shaped to be manipulated by a thumb or a finger of a user. In some embodiments, the suction regulator aperture 108 is not located on the plunger slide 106, and is instead positioned on the side or the back of the handle 102, to prevent a user from accidentally covering the suction regulator aperture 108 and causing suction when it is not desired. In other embodiments, both the suction regulator aperture 108 and the plunger slide 106 are located on a side or back of the handle 102. The plunger slide 106 comprises one or more protrusions 112 which extend away from the plunger slide 106. The protrusions 112 are configured such that a user of the unit dose suction brush 100 can easily apply pressure to the plunger slide 106 to move the plunger slide 106. In some embodiments, the plunger slide 106 makes an audible click as it is moving from an initial position to a final position, and/or when fully engaged. In an embodiment, the plunger slide 106 comprises one or more visual indicia 114, configured to readily instruct a user of the unit dose suction brush 100 on the operation of the plunger slide 106. The visual indicia 114 extend away from the plunger slide 106. In alternative embodiments, the visual indicia 114 may be formed flush on the plunger slide 106 or extend inwardly.

Figure 7:
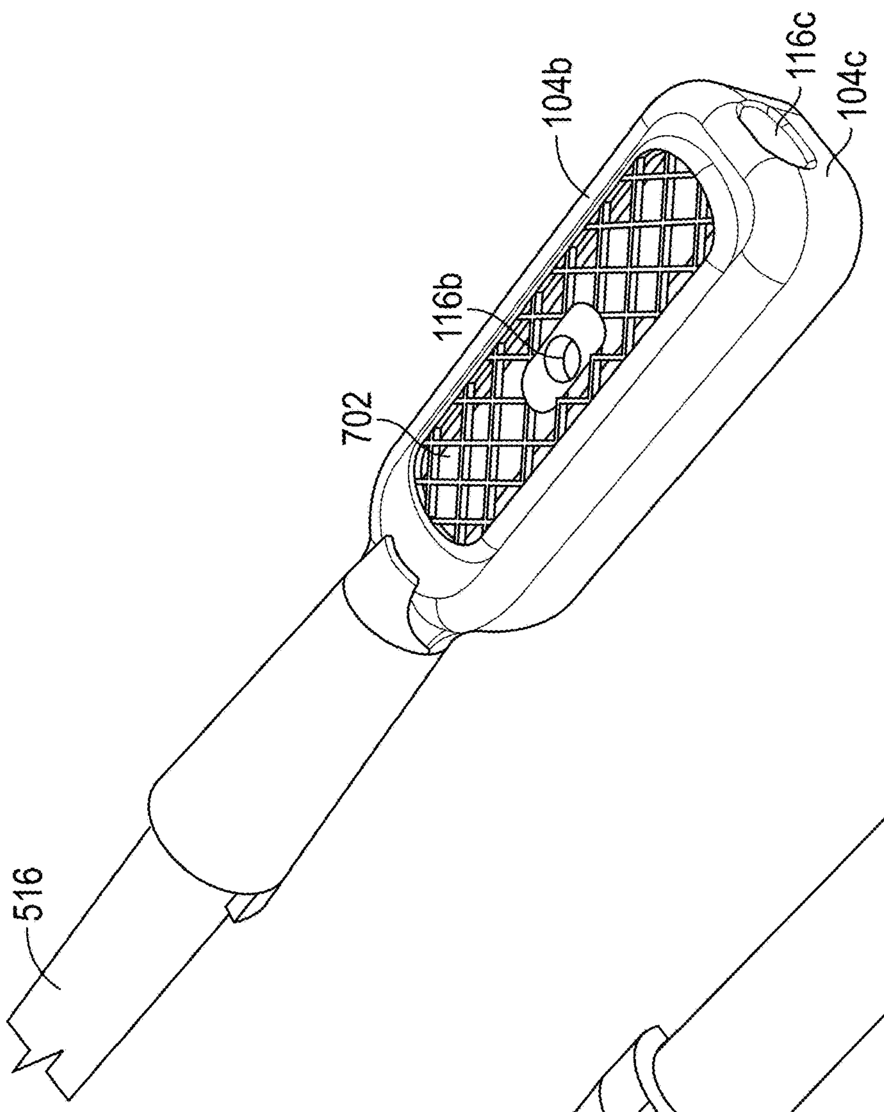
FIGS. 6 and 7 are enlarged front and rear perspective views, respectively, of a cleaning head in accordance with an embodiment of the present disclosure.
Figure 6:
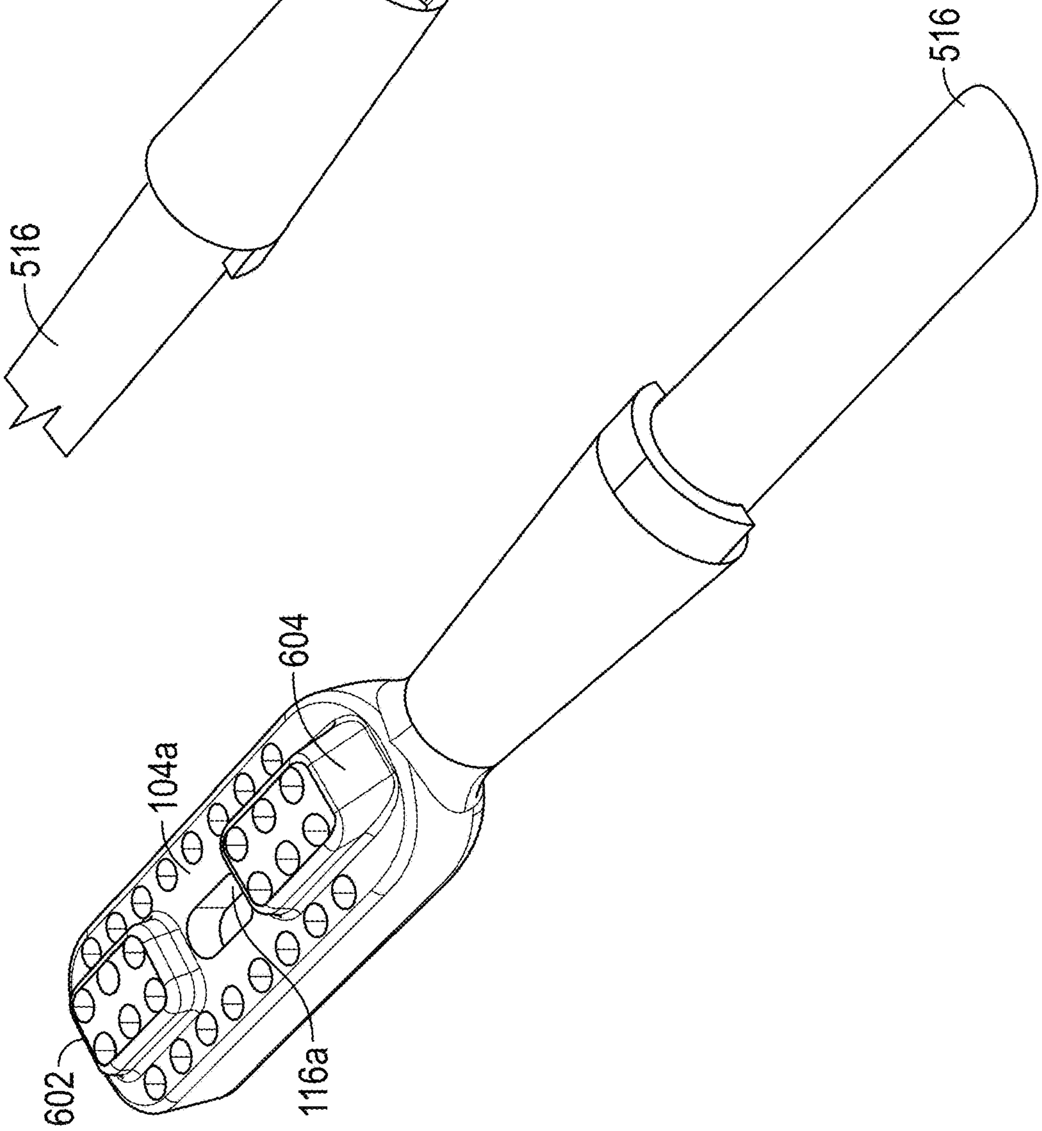

The cleaning head includes a front face 104*a*, a back face 104*b* located opposite thereto, and a top face 104*c* extending therebetween (shown in FIGS. 6 and 7). The cleaning head may include one or more cleaning elements. In some embodiments, the cleaning elements are bristles. As shown, a plurality of bristles 110 may extend away from the front surface 104*a* of the cleaning head 104. The cleaning head 104 may further comprise one or more suction ports 116. In one embodiment, the cleaning head 104 comprises three suction ports 116, including a front suction port 116*a* located on the front surface 104*a* of the cleaning head 104; a top suction port 116*c* located on the top surface 104*c* of the cleaning head 104; and a back suction port 116*b* located on the back surface 104*b* of the cleaning head 104. As discussed in greater detail below, the interior of the cleaning head 104 is hollow such that the one or more suction ports 116 are communicatively connected to one another. In an embodiment, the bristles 110 are arranged in a regular pattern surrounding the front suction port 116*a*.

Figure 5:
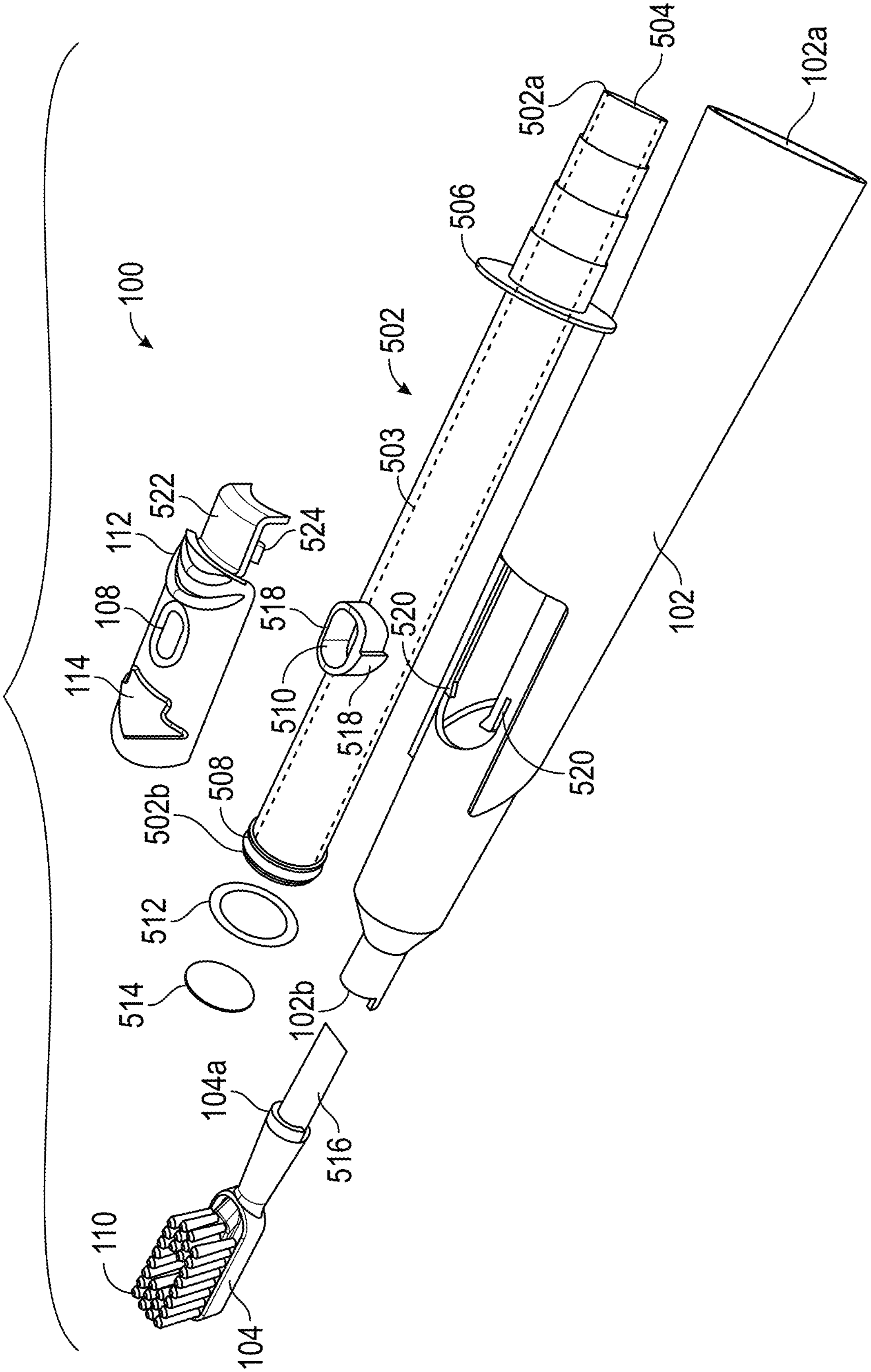
FIG. 5 is an exploded perspective view of the oral cleaning device of FIG. 1.

As shown in FIG. 5, a plunger 502 is disposed within the handle 102. The plunger 502 comprises a bottom end 502*a* and a top end 502*b*. When the plunger 502 is placed within the hollow handle 102, the bottom end 102*a* of the handle 102 is located proximate the bottom end 502*a* of the plunger 502, and the top end 102*b* of the handle 102 is located proximate the top end 502*b* of the plunger 502. The plunger 502 is moveable between a first position (such as that shown in FIG. 8) where the plunger 502 is spaced at a distance away from the top end 102*b* of the handle, and a second position (such as that shown in FIG. 9) where the plunger 502 is moved closer to (compared with the first position) or is adjacent to the top end 102*b* of the handle.

In some embodiments, the plunger 502 comprises a hollow suction channel 503 stretching from the bottom end 502*a* to the top end 502*b* of the plunger 502. A vacuum port 504 is located at the bottom end 502*a* of the plunger 502. In an embodiment, the bottom end 502*a* of the plunger 502 tapers, such that the terminal portion of the bottom end 502*a* is narrower than the rest of the plunger 502. The bottom end 502*a* is configured to be connected to a vacuum hose (not shown). The bottom end 502*a* may be inserted into the vacuum hose, such that the vacuum port 504 is operatively connected to the vacuum hose.

The plunger 502 comprises a bottom rim 506 and a top rim 508, each of which extend radially away from the plunger 502 and are configured to stabilize the plunger 502 within the handle 102. The plunger comprises a vacuum channel 510 which extends away from the front face of the plunger 502 and is configured to fluidly connect the hollow interior of the plunger 502 to the suction regulator aperture 108 on the plunger slide 106. The plunger 502 is constructed from an impermeable or non-porous material, such that the only openings via which air can pass from the exterior portion of the plunger 502 to the hollow interior of the plunger 502 are the vacuum port 504, the top end 502*b*, and the vacuum channel 510 (which are communicatively connected together).

The vacuum channel 510 may include a locking mechanism. In some embodiments, the locking mechanism preferably includes a pair of laterally extending teeth 518 which are ramped such that the teeth 518 protrude from the vacuum channel 510 at the suction end 100*a* of the vacuum channel 510 and are flush with the vacuum channel 510 at the cleaning end 100*b* of the vacuum channel 510. The teeth 518 are configured to mate or form a ratchet with a pair of laterally, inwardly extending pawls 520 on the handle 102. The pawls 520 are constructed such that they may deform in the lateral direction. As the teeth 518 slide along the pawls 520 toward the cleaning end 100*b*, the pawls 520 deform, bending laterally away from the vacuum channel 510. Once the pawls 520 slide past the teeth 518, the pawls 520 snap back into place against the vacuum channel 510 and press against the suction end 100*a* of the teeth 518, preventing the vacuum channel 510 (and thus the plunger 502 and plunger slide 106 as a whole) from moving back towards the suction end 100*a*.

In an embodiment, the interior surface of the suction regulator aperture 108 curves inwardly, such that the suction regulator aperture 108 is sealably connected to the vacuum channel 510. In other words, when an object (such as the surface of a user's finger or thumb) is placed over the suction regulator aperture 108, the suction regulator is sealed.

The top rim 508 may be configured to secure a flexible gasket or an O-ring 512 in place between the plunger 502 and the handle 102, such that there is an airtight seal between the plunger 502 and the handle 102. In an alternative embodiment, an airtight seal between the plunger 502 and the handle 102 is formed with a gasket in the place of the O-ring 512. In another alternative embodiment, an airtight seal between the plunger 502 and the handle 102 is formed by a process in which the plunger 502 and handle 102 are co-molded to produce an exact, airtight fit between those two components. A seal 514 is placed across the top end 502*b* of the plunger 502, such that the top end 502*b* of the plunger 502 is airtight while the seal 514 is in place. In embodiments, the seal 514 comprises foil, plastic, or a foil/plastic laminate and is impermeable to air. The seal 514 is configured such that it will readily break when pressed against a sharp surface.

Referring again to FIGS. 6 and 7, the figures depict enlarged views of the cleaning head 104 with the bristles 110 removed so that the structure of the cleaning head 104 may be more clearly understood. As shown, a front suction port 116*a* is located on the front surface 104*a* of the cleaning head 104; a top suction port 116*c* is located on the top surface 104*c* of the cleaning head 104; and a back suction port 116*b* is located on the back surface 104*b* of the cleaning head 104. The front surface 104*a* includes a top protrusion 602 and a bottom protrusion 604, both of which extend outwardly from the front surface 104*a* and are configured such that a plurality of bristles 110 may be mounted thereupon. The front suction port 116*a* is located between the top protrusion 602 and the bottom protrusion 604. As a result, the likelihood that an object will block the front suction port 116*a* is greatly reduced. Further, the protrusions 602, 604 enable the cleaning solution to readily adhere to the front surface 104*a* and the bristles 110. As shown, the edges of the cleaning head 104 may be chamfered so as to reduce the likelihood that a patient's mouth will be injured by the cleaning head 104.

The back face 104*b* of the cleaning head 104 includes a textured portion 702 surrounding the back suction port 116. In an embodiment, the textured portion 702 comprises a grid of diagonal protrusions or a waffle surface. This textured portion 702 enables the cleaning solution to readily adhere to the back surface 104*b* of the cleaning head 104 and assists in the use of the back surface 104*b* for scrubbing and the removal of saliva, mucus and other liquid and semi-liquid material during use. Further, the textured portion 702 reduces the likelihood that an object will block the back suction port 116*b* during use. In an alternative embodiment, the textured portion 702 is used as a glue or adhesive surface for attaching foam, textured portion 702 is used as a glue or adhesive surface for attaching foam, textured rubber, felt, or a similar material to the back face 104*b*. The foam, textured rubber, felt or similar material provides the benefits of serving as an additional cleaning surface and serving as a substrate for retaining oral cleansing solution during cleansing of the mouth.

Figure 8:
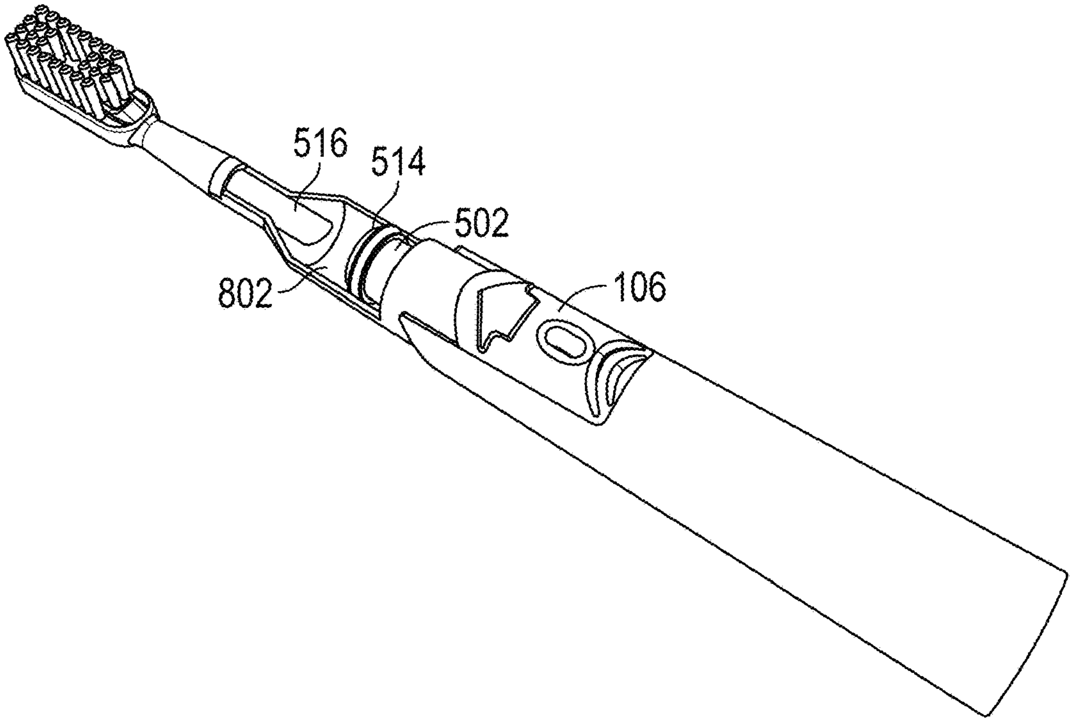
FIG. 8 is a partial cutaway view of an oral cleaning device with the plunger slide in an initial position.
Figure 9:
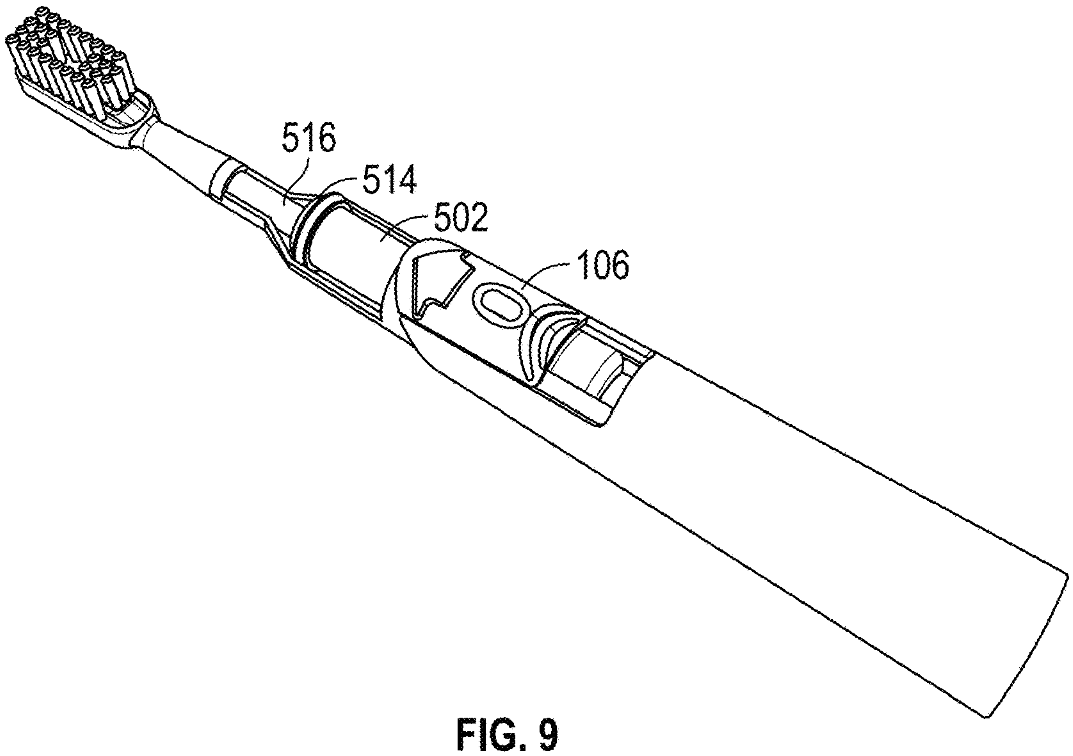
FIG. 9 is a partial cutaway view of an oral cleaning device with the plunger slide in a final position.
Figure 10:
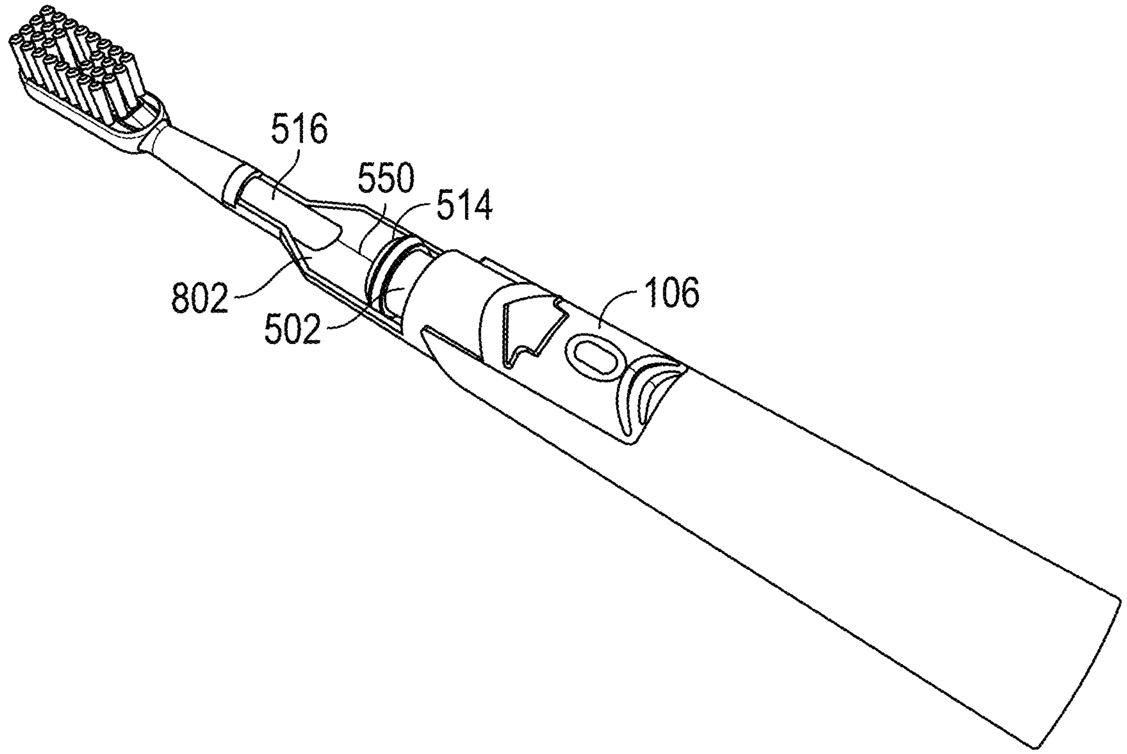
FIG. 10 is a partial cutaway view of an oral cleaning device with the plunger slide in an initial position in an embodiment having a secondary foil for enclosing oral solution.

FIGS. 8-11 depict partial cutaway views of the unit dose brush 100, such that the interior structure surrounding the solution chamber 802 may be more readily understood. As shown in FIG. 8, solution chamber 802 is formed in the top end 102*b* of the handle 102 and is configured to hold a unit dosage of cleaning solution (not shown). In an embodiment, the cleaning solution comprises an oral cleaning gel that is more viscous than water. The solution chamber 802 is above the seal 514, such that the cleaning solution cannot enter the interior of the plunger 502 while the seal 514 is intact. The cleaning head 104 includes a piercing element 516 extending downwardly from the cleaning head 104 through the neck 118 into the handle 102, such that the piercing element 516 is configured to break the seal 514 when the plunger 502 is moved sufficiently upward.

The unit dose brush 100 is assembled by securing the seal 514 over the top opening 502*b* of the plunger 502, securing the O-ring 512 against the top rim 508 of the plunger, inserting the plunger 502 into the bottom end 102*a* of the handle 102, inserting the flange 522 of the plunger slide 106 between the plunger 502 and the handle 102 such that the snap locks 524 secure the plunger slide 106 slidably in place, filling the solution chamber 802 with oral cleaning solution, inserting the piercing element 516 into the top end 102*b* of the handle 102, and securing the cleaning head 104 to the handle 102.

In FIG. 8, the plunger slide 106 is in its initial position proximate the suction end 100*a* of the unit dose suction brush 100, and the plunger 502 is in the first position. As the plunger slide 106 is moved towards the cleaning end 100*b*, and the plunger 502 is moved to or towards the second position, the cleaning solution is pushed out of the solution chamber by the seal 514 located at the top end 502*b* of the plunger 502. The cleaning solution travels through the hollow channel in the cleaning head 104 and is expelled through the suction ports 116 located on the cleaning head 104. Once a majority of the cleaning solution has been expelled, the piercing element 516 contacts and ruptures the seal 514, bringing the solution chamber 802 and the suction ports 116 into communicative connection with the vacuum port 504 and the suction regulator aperture 108. By controlling the extent to which the opening in the suction regulator aperture 108 is covered (such as by a finger or thumb), the amount of suction at the suction ports 116 may be controlled. For example, by covering the opening in the suction regulator aperture 108, the suction at the suction ports 116 is increased. By uncovering the opening in the suction regulator aperture 108, the amount of suction at the suction ports 116 is decreased. The amount of suction at the suction ports 116 may thus be varied by partially covering the suction regulator aperture 108.

Once the plunger slide 106 is pushed to its final position proximate the cleaning end 100*b*, it may be locked in place as the teeth 518 on the vacuum channel 510 ratchet against the pawls 520 in the handle 102. This prevents a user from attempting to reuse the unit dose suction brush 100, which would increase the risk of the user introducing bacteria or other contaminants into the mouth and thereby increasing the risk of contracting a serious disease, such as pneumonia.

In some embodiments, there is a second seal provided near the end of the piercing element 516 which provides access to the hollow channel of the cleaning head 104. In this way, the oral solution is held in the solution chamber 802 in a sealed manner. The seal comprises foil, plastic, or a foil/plastic laminate and is impermeable to air. For example, in FIG. 10, there may be provided a second seal (not shown) at the piercing element 516 closing off access to the hollow channel. As shown, the plunger slide 106 is in its initial position proximate the suction end 100*a* of the unit dose suction brush 100 and the plunger further includes a second piercing element 550 extended therefrom. The second seal is configured such that it will readily break when pressed against a sharp surface. As the plunger slide 106 is moved towards the cleaning end 100*b*, the second piercing element 550 is pushed toward the second seal by the seal 514 located at the top end 502*b* of the plunger 502, and the second seal is punctured by the second piercing element 550. As the plunger is moved further towards the cleaning end 100*b*, the oral solution exits the oral solution chamber 802 through the punctured second seal. The cleaning solution travels through the hollow channel in the cleaning head 104 and is expelled through the suction ports 116 located on the cleaning head 104. Once a majority of the cleaning solution has been expelled, the piercing element 516 contacts and ruptures the seal 514, bringing the solution chamber 802 and the suction ports 116 into communicative connection with the vacuum port 504 and the suction regulator aperture 108, as described above.

Figure 11:
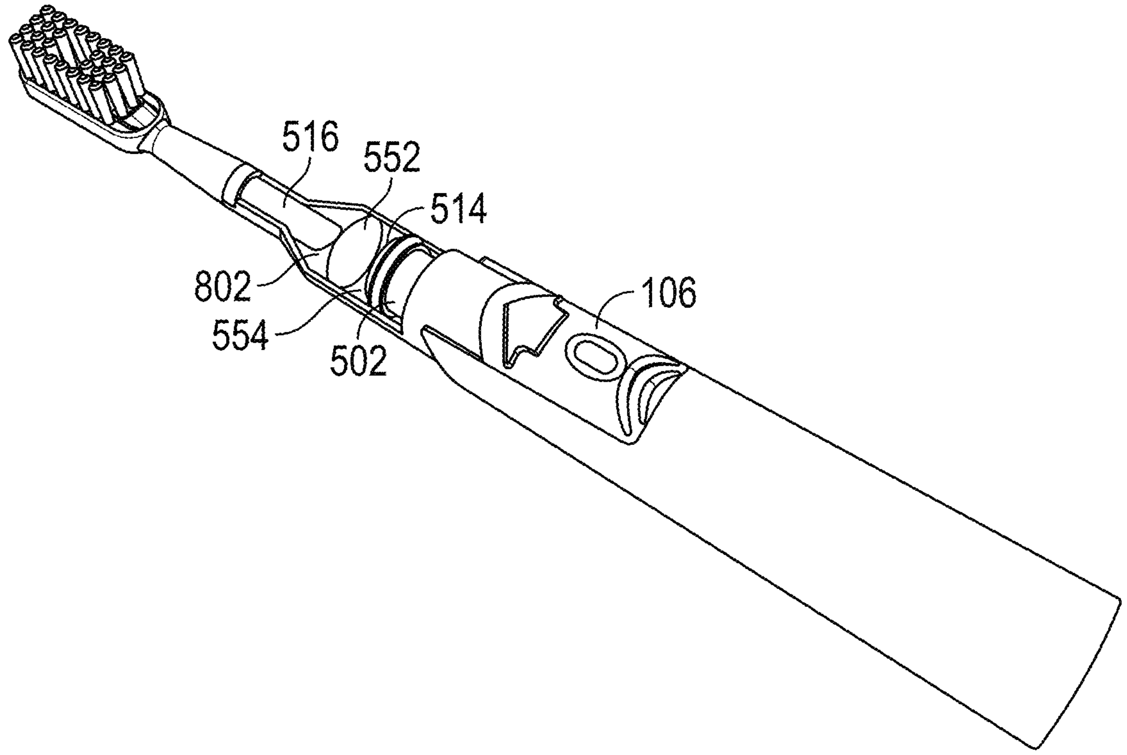
FIG. 11 is a partial cutaway view of an oral cleaning device with the plunger slide in an initial position in an embodiment having an oral solution capsule.

In another embodiment, such as that shown in FIG. 11, the plunger slide 106 is in its initial position proximate the suction end 100*a* of the unit dose suction brush 100 and includes an oral solution capsule 552. The oral solution capsule 552 comprises foil, plastic, or a foil/plastic laminate and is impermeable to air. The oral solution capsule 552 is configured such that it will readily break when pressed against a sharp surface. As the plunger slide 106 is moved towards the cleaning end 100*b*, the oral solution capsule 552 is pushed toward the piercing element 516 by the top end 502*b* of the plunger 502 and the oral solution capsule 552 is punctured by the piercing element 516. As the plunger is moved further towards the cleaning end 100*b*, the oral solution exits the oral solution capsule 552 and the solution chamber. The cleaning solution travels through the hollow channel in the cleaning head 104 and is expelled through the suction ports 116 located on the cleaning head 104. Once a majority of the cleaning solution has been expelled, the piercing element 516 contacts and ruptures the other side of the oral solution capsule 552 as well as the seal 514, bringing the solution chamber 802 and the suction ports 116 into communicative connection with the vacuum port 504 and the suction regulator aperture 108, as described above. In this embodiment, there may not be a seal 514, and the piercing element 516 need only pierce both sides of the capsule 552 before the suction can be provided to the cleaning head 104.

In an alternative embodiment, a unit dose brush without suction is provided. Aside from the differences described below, this embodiment is generally similar to unit dose suction brush 100. However, the vacuum port 504 is omitted and the plunger 502 is to be solid, rather than hollow. The seal 514 and piercing element 516 are omitted, as the top end 502*b* of the plunger 502 is solid. The suction regulator aperture 108 is similarly omitted. In an alternative embodiment, the teeth 518 and pawls 520 are replaced with a series of teeth and pawls, enabling the plunger 502 to be secured in numerous locations, each corresponding to a single dose of cleaning solution. In this way, the brush may be used multiple times.

Figure 12:
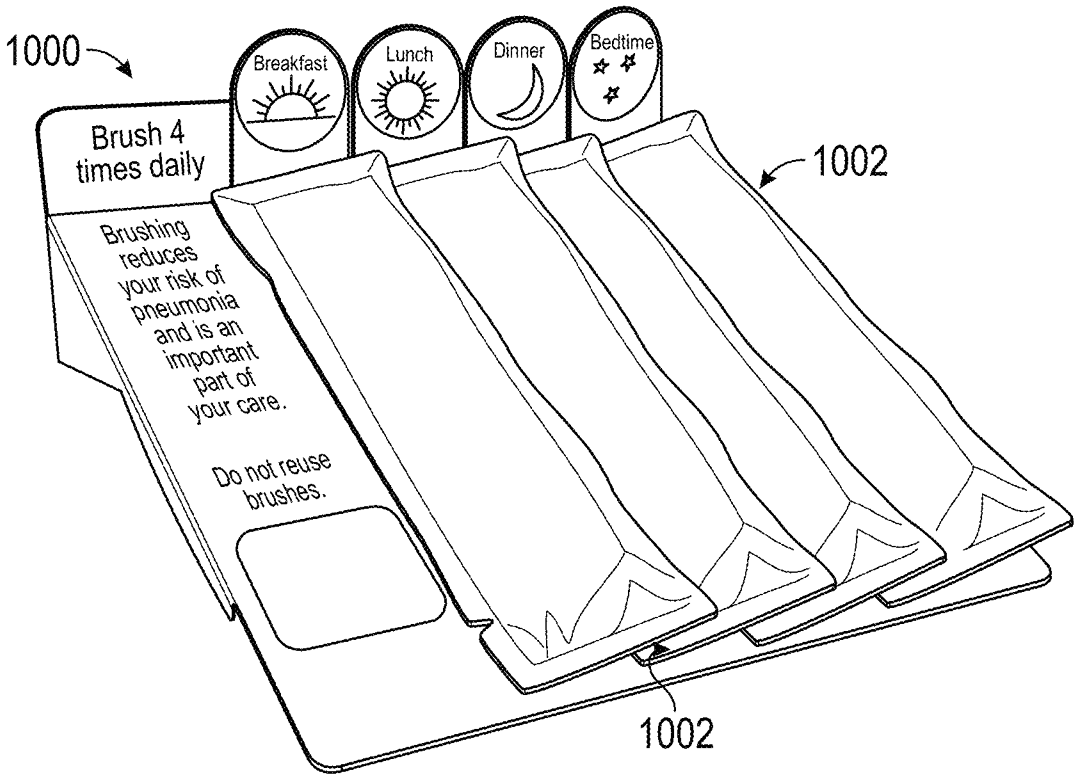
FIG. 12 is a compliance system compromising a plurality of individually packaged oral cleaning devices in accordance with an embodiment of the present disclosure.

As shown in FIG. 12, a compliance system comprises a container 1000 holding a plurality of individually packaged items 1002. Each of the individually packaged items 1002 may be, for example, a unit dose brush 100. Each of the items is sealed within a package, such that the items 1002 must be removed from the packaging prior to use. In an embodiment, the packaging includes directions regarding the use of the item contained therein.

The container 1000 is configured to hold the packaged items 1002 sequentially. For example, as shown, the packaged items 1002 may be arranged such that there is an item to be used at breakfast, an item to be used at lunch, an item to be used at dinner, and an item to be used at bedtime. Other sequential arrangements (e.g., organizing based on predetermined times, days or other intervals) will also be readily apparent to one of skill in the art based on the present disclosure.

Compliance with a treatment plan can be readily determined by visually inspecting the container 1000. For example, if it is lunchtime and the item to be used at breakfast is still present in the container 1000, it can be determined that the breakfast item was not used and the treatment plan was not adhered to. The container 1000 may contain an area for a compliance monitor (such as a physician or nurse) to indicate that the treatment plan has been followed. Other information, such as the start time and date or instructions for use of the items 1002, may also be provided on the container. In a preferred embodiment, each of the items 1002 is configured to be used a single time before being recycled or discarded. Accordingly, the breakfast item may not be reused at lunch, making compliance with the treatment plan readily ascertainable.

In an embodiment, each item is an individually packaged unit dose brush 100, complete with a unit dose of cleaning solution (such as toothpaste, cleaning gel, or another dentifrice). To use the system, an individual removes the correct unit dose brush (e.g., the "breakfast" brush after eating breakfast) and opens the packaging. The unit dose brush already contains a predetermined amount of cleaning solution and may be used immediately, as described above. When finished, the individual discards or recycles the brush, for example in a provided container. At the next time determined by the treatment plan (e.g., after lunch), the individual selects the correct item for that time. If the individual fails to follow the treatment plan (e.g., does not brush after lunch), a compliance monitor will be alerted upon visually inspecting the container 1000, as the unit dose brush for a previous time will still be present in the container.

One of skill in the art will recognize that all the various components identified in this disclosure may be made from any material or combination of materials suitable for the usage and environment, including, without limitation, metals, composites, engineered plastics, natural or synthetic materials, etc. Furthermore, such components may be formed in any conventional manner, such as by molding, casting, machining, cold or hot forming, forging, etc. Still further, such components may be finished in any conventional manner, such as painting, powder coating, plating, etc., or may be unfinished.

Furthermore, while the particular preferred embodiments have been shown and described, it is obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective, based on the related art.

What is claimed is:

1. An oral care system comprising:

a first package having a first identifier associated with a first time of day, the first package containing a first unit dose suction brush comprising:

a first handle having a first brush first end and a first brush second end opposite the first brush first end, the first handle having a first suction channel extending from the first brush first end to the first brush second end, a first cleaning head connected to the first brush first end, the first cleaning head comprising:

a first suction port, and a plurality of first bristles arranged in a first pattern surrounding the first suction port, and a first vacuum port located at the first brush second end, the first vacuum port in fluid communication with the first suction port via the first suction channel;

a second package having a second identifier associated with a second time of day, the second package containing a second unit dose suction brush comprising:

a second handle having a second brush first end and a second brush second end opposite the second brush first end, the second handle having a second suction channel extending from the second brush first end to the second brush second end, a second cleaning head connected to the second brush first end, the second cleaning head comprising:

a second suction port, and a plurality of second bristles arranged in a second pattern surrounding the second suction port, and a second vacuum port located at the second brush second end, the second vacuum port in fluid communication with the second suction port via the second suction channel; and a container holding the first package and the second package such that the first package is selectively removable from the container independent of removal of the second package from the container and the second package is selectively removable from the container independent of removal of the first package from the container;

wherein the first package is not coupled to the second package.

2. The oral care system of claim 1, wherein each of the packages further contains a unit dose of an oral cleaning solution.

3. The oral care system of claim 1, wherein:

the first identifier is a first image; and the second identifier is a second image.

4. The oral care system of claim 3, wherein:

the first image comprises a sun; and the second image comprises a moon.

5. The oral care system of claim 1, wherein the first time of day and the second time of day for use of each of the packages is associated with a meal time.

6. The oral care system of claim 1, wherein the first cleaning head comprises a third suction port.

7. The oral care system of claim 6, wherein the first suction port is on a front face of the first cleaning head and the second suction port is on an end face of the first cleaning head.

8. A method comprising:

obtaining the oral care system of claim 1;

selecting the first package based on a particular time of day and the first identifier; and removing the first unit dose suction brush from the first package.

9. The method of claim 8, further comprising coupling a suction device to the first vacuum port.

10. The method of claim 8, wherein:

each of the packages further contains a unit dose of an oral cleaning solution; and the method further comprises exposing the first cleaning head to the oral cleaning solution.

11. The method of claim 8, wherein:

the first identifier is a first image; and the second identifier is a second image.

12. The method of claim 11, wherein:

the first image comprises a sun; and the second image comprises a moon.

13. The method of claim 8, wherein the particular time of day for use of each of the packages is associated with a meal time.

14. The method of claim 8, wherein the first cleaning head further includes two openings in fluid communication with the first suction channel.

15. The method of claim 14, wherein a first opening of the two openings is on a front face of the first cleaning head and a second opening of the two openings is on an end face of the first cleaning head.

* * * * *